(12) United States Patent
Eveleigh et al.

(10) Patent No.: US 11,821,181 B2
(45) Date of Patent: Nov. 21, 2023

(54) HOT FLUSHING OF BUILDING WATER SYSTEM

(71) Applicant: Magarl, LLC, Naples, FL (US)

(72) Inventors: Robert B. Eveleigh, Naples, FL (US); Cameron West, Greenfield, IN (US)

(73) Assignee: Magarl, LLC, Naples, FL (US)

( * ) Notice: Subject to any disclaimer, the term of this patent is extended or adjusted under 35 U.S.C. 154(b) by 353 days.

(21) Appl. No.: 16/928,150

(22) Filed: Jul. 14, 2020

(65) Prior Publication Data

US 2021/0131079 A1 May 6, 2021

Related U.S. Application Data

(60) Provisional application No. 62/874,683, filed on Jul. 16, 2019.

(51) Int. Cl.
| | |
|---|---|
| *E03B 7/00* | (2006.01) |
| *F24D 17/00* | (2022.01) |
| *E03B 7/07* | (2006.01) |
| *C02F 1/02* | (2023.01) |

(52) U.S. Cl.
CPC ........... *E03B 7/006* (2013.01); *C02F 1/02* (2013.01); *E03B 7/074* (2013.01); *F24D 17/0073* (2013.01); *C02F 2301/043* (2013.01)

(58) Field of Classification Search
CPC ...... E03B 7/045; E03B 7/006; F24D 17/0073; F24D 17/0078
See application file for complete search history.

(56) References Cited

U.S. PATENT DOCUMENTS

| | | | |
|---|---|---|---|
| 5,011,598 A * | 4/1991 | Nathanson | E03B 7/08 210/167.01 |
| 5,050,640 A | 9/1991 | Cowley | |
| 9,702,470 B2 | 7/2017 | Paul | |
| 2002/0139420 A1* | 10/2002 | Ebster | F24D 17/0073 137/563 |
| 2004/0069323 A1* | 4/2004 | Komarek | C02F 5/12 134/22.12 |
| 2009/0145490 A1* | 6/2009 | Kershisnik | F24D 17/0078 137/334 |
| 2012/0061483 A1* | 3/2012 | Lee | E03B 7/045 237/63 |
| 2012/0192965 A1* | 8/2012 | Popper | E03C 1/0408 137/357 |
| 2017/0356172 A1* | 12/2017 | Searcy | E03C 1/0408 |

FOREIGN PATENT DOCUMENTS

| | | |
|---|---|---|
| DE | 20300715 U1 | 5/2003 |
| FR | 2916033 | 11/2008 |
| WO | 0161224 | 8/2001 |
| WO | 2008116242 | 10/2008 |

* cited by examiner

*Primary Examiner* — Reinaldo Sanchez-Medina

(74) *Attorney, Agent, or Firm* — John V. Daniluck; Dentons Bingham Greenebaum LLP

(57) ABSTRACT

Apparatus and methods for improved hot water flushing of a water supply system.

15 Claims, 14 Drawing Sheets

HOT FLUSHING OF BUILDING WATER SYSTEM

CROSS REFERENCE TO RELATED APPLICATION

This application claims the benefit of priority to U.S. Provisional Patent Application Ser. No. 62/874,683, filed Jul. 16, 2019, incorporated herein by reference.

FIELD OF THE INVENTION

Various embodiments of the present invention pertain to methods and apparatus for introducing high temperature water into a potable water system for purposes of sanitizing the system.

BACKGROUND OF THE INVENTION

Many buildings (such as hospitals, hotels, office buildings, homes, industrial plants) include water tempering systems to provide a controlled maximum temperature water (or tepid or tempered water) to the various fixtures (wash basin faucets, showers, drinking water outlets and the like) within the building water system. This intermediate temperature water is often produced in a thermostatically controlled mixing valve, in which the mixing valve is provided with colder water from the building plumbing to a mixing valve cold inlet, and in which water from the building plumbing is further provided to a water heater. Heated water is also provided to a hot inlet of the mixing valve, and the valve then provides a controlled mixing of cold and hot flow streams to achieve a safe maximum (or tepid) temperature. In such systems the users are provided protection from overly hot water (such as when showering or washing hands) by setting a safe maximum temperature at the valve control system, or alternatively provided safe tepid water for emergency washing.

It is important to periodically flush a building water system with higher temperature water to clean out impurities and contaminants, especially parts of the system that could harbor the bacterium *Legionella*, which can result in a building occupant contracting Legionnaires' disease (LD). Some of the current maintenance practices include making temporary adjustments to the set point of the thermostatic mixing valve(s) to produce hotter water. However, this resetting of the mixing valve(s) requires time both to reset hot, and then reset back to a safe temperature. Further, each reset of a mixing valve incurs the possibility of the valve being improperly set to a mixed outlet temperature that is unsafe for washing or showering.

Yet another maintenance practice includes making temporary changes in the plumbing or the system to permit an increased flow of water. However, these temporary changes are costly to implement, and also have an increased probability of the changes (whether to the temporary flowpath or back to the normal flowpath) being made incorrectly.

What is needed are improvements that address one or more of the aforementioned problems. Various embodiments of the present invention provide such novel and nonobvious solutions.

SUMMARY OF THE INVENTION

One embodiment of the inventions described herein include apparatus and methods for flushing a water supply system, including a water heater providing hotter water, and a source of cooler water. Some embodiments further include a mixing valve adapted and configured to mix hotter water and cooler water and provide tempered water at an automatically controlled temperature to a water supply system of a building; and a pump receiving water from the water supply system and providing the water at a higher pressure. Still other embodiments include a multi-flowpath actuatable valve having an inlet receiving pressurized water from the pump, one outlet in fluid communication with the source of cooler water, and another outlet in fluid communication with the hotter water, the actuatable valve being actuatable to a first position in which the inlet is in fluid communication with the one outlet, and actuatable to a second position in which the inlet is in fluid communication with the other outlet.

Yet another embodiment of the inventions described herein include apparatus and methods for flushing a water supply system, including a water heater receiving water from a first source and a second source of water. Some embodiments include a mixing valve, a pump, and a multi-flowpath actuatable valve actuatable between multiple position. Still further embodiments include a variable restriction downstream of the actuatable valve.

Yet another embodiment of the inventions described herein include apparatus and methods for flushing a water supply system, including a first source and providing hotter water, and a second source of cooler water. Some embodiments further include a mixing valve configured to receive water from the first and second sources, the mixing valve being adapted and configured to mix hot water and water from the second source and provide tempered water at an intermediate temperature to a water system of a building, and also a pump receiving water from the building water supply system and providing the water at a higher pressure. Yet other embodiments include a second multi-flowpath actuatable valve having a second inlet receiving water from the first source, an outlet, and a first inlet receiving intermediate temperature water from the mixing valve, the second actuatable valve being actuatable to a first position in which the first inlet is in fluid communication with the outlet, and actuatable to a second position in which the second inlet is in fluid communication with the outlet.

Yet another embodiment of the inventions described herein include apparatus and methods for an alternative way of flowing water relative to a water supply system. Some embodiments further include a mixing valve (MV) having a first MV inlet configured to receive water from a first source and a second MV inlet receiving water from a second source, the mixing valve being adapted and configured to mix the two sources of water together and provide mixed water to a building. Some embodiments further include a pump receiving water from the water supply system and providing it at a higher pressure, and also a second multi-flowpath actuatable valve having an inlet receiving hot water from a first source, a first outlet in fluid communication with the first MV inlet, and a second outlet providing water to the second MV inlet, the second actuatable valve being actuatable to a first position in which the 2MF inlet is in fluid communication with the first 2MF outlet, and actuatable to a second position in which the 2MF inlet is in fluid communication with the second 2MF outlet.

Yet another embodiment of the inventions described herein include apparatus and methods for flushing a water supply system, including first multi-flowpath (1MF) actuatable valve having a 1MF inlet receiving pressurized water from the water supply system, and an 1MF outlet in fluid communication with a first source of water, the first actuatable valve being actuatable to a first position in which the 1MF inlet is not in fluid communication with the 1MF outlet, and actuatable to a second position in which the 1MF inlet is in fluid communication with the 1MF outlet; and a second multi-flowpath (2MF) actuatable valve having a 2MF inlet receiving hot water from said water heater, and a 2MF outlet in fluid communication with the second MV inlet, said second actuatable valve being actuatable to a first position in which the second MV inlet is not in fluid communication with the 2MF outlet, and actuatable to a second position in which the second MV inlet is in fluid communication with the 2MF outlet, and a second multi-flowpath (2MF) actuatable valve having a 2MF inlet receiving water from the first source, and a 2MF outlet in fluid communication with an inlet of a mixing valve, the second actuatable valve being actuatable to a first position in which the mixing valve inlet is not in fluid communication with the 2MV outlet, and actuatable to a second position in which the mixing valve inlet is in fluid communication with the 2MV outlet.

Yet another embodiment of the inventions described herein include apparatus and methods for flushing a water supply system of a building, including a first multi-flowpath (1MF) actuatable valve having a 1MF inlet receiving water from the building water supply system return, a first 1MF outlet, and a second 1MF outlet in fluid comm. with a first source of water, the first actuatable valve being actuatable to a first position in which the 1MF inlet is in fluid comm. with the first 1MF outlet, and actuatable to a second position in which the 1MF inlet is in fluid comm. with the second 1MF outlet; and a second multi-flowpath (2MF) actuatable valve having a first 2MF inlet receiving water from the second source of water, a second 2MF inlet in fluid comm. with a first the inlet of a mixing valve, and a 2MF outlet in fluid comm. with a second inlet of the mixing valve, the second actuatable valve being actuatable to a first position in which the first 2MF inlet is in fluid comm. with the 2MF outlet, and actuatable to a second position in which the second 2MF inlet is in fluid comm. with the 2MF outlet.

Yet another embodiment of the inventions described herein include apparatus and methods for flushing a water supply system, including a first source of water, and a second source of water, and a third source of cold water in fluid communication with the second source of water. Some embodiments include a first multi-flowpath (1MF) actuatable valve having a 1MF inlet receiving water returned from water supply system, a first 1MF outlet in fluid communication with the second source, and a second 1MF outlet in fluid communication with the first source, the first actuatable valve being actuatable to a first position in which the 1MF inlet is in fluid communication with the first 1MF outlet, and actuatable to a second position in which the 1MF inlet is in fluid communication with the second 1MF outlet; and a second multi-flowpath (2MF) actuatable valve having a first 2MF inlet receiving water from the first source, a second 2MF inlet in fluid communication with third source of water, and a 2MF outlet in fluid communication with an inlet of a mixing valve, the second actuatable valve being actuatable to a first position in which the second 2MF inlet is in fluid communication with the 2MF outlet, and actuatable to a second position in which the first 2MF inlet is in fluid communication with the 2MF outlet.

Yet another embodiment of the inventions described herein include apparatus and methods for an alternative flushing configuration within a water supply system configured for providing tempered water, including a first source of hot water, and a second source of water. Some embodiments include a first multi-flowpath (1MF) actuatable valve having a 1MF inlet receiving water after the water has passed through a portion of the water supply system, a first 1MF outlet in fluid comm. with the second source, and a second 1MF outlet in fluid comm. with the first source, the first actuatable valve being actuatable to a first position in which the 1MF inlet is in fluid comm. with the first 1MF outlet, and actuatable to a second position in which the 1MF inlet is in fluid comm. with the second 1MF outlet. Still further embodiments include a second multi-flowpath (2MF) actuatable valve having a first 2MF inlet receiving hot water from the first source, a second 2MF inlet in fluid comm. with the second source, and a 2MF outlet in fluid comm. with the second MV inlet, the second actuatable valve being actuatable to a first position in which the second 2MF inlet is in fluid comm. with the 2MF outlet, and actuatable to a second position in which first 2MF inlet is in fluid comm. with the 2MF outlet.

BRIEF DESCRIPTION OF THE DRAWINGS

Some of the figures shown herein may include dimensions. Further, the figures shown herein may have been created from scaled drawings, scaled models, or from photographs that are scalable. It is understood that such dimensions, or the relative scaling within a figure, are by way of example, and not to be construed as limiting unless so stated in a claim.

ELEMENT NUMBERING

Figure 1A:
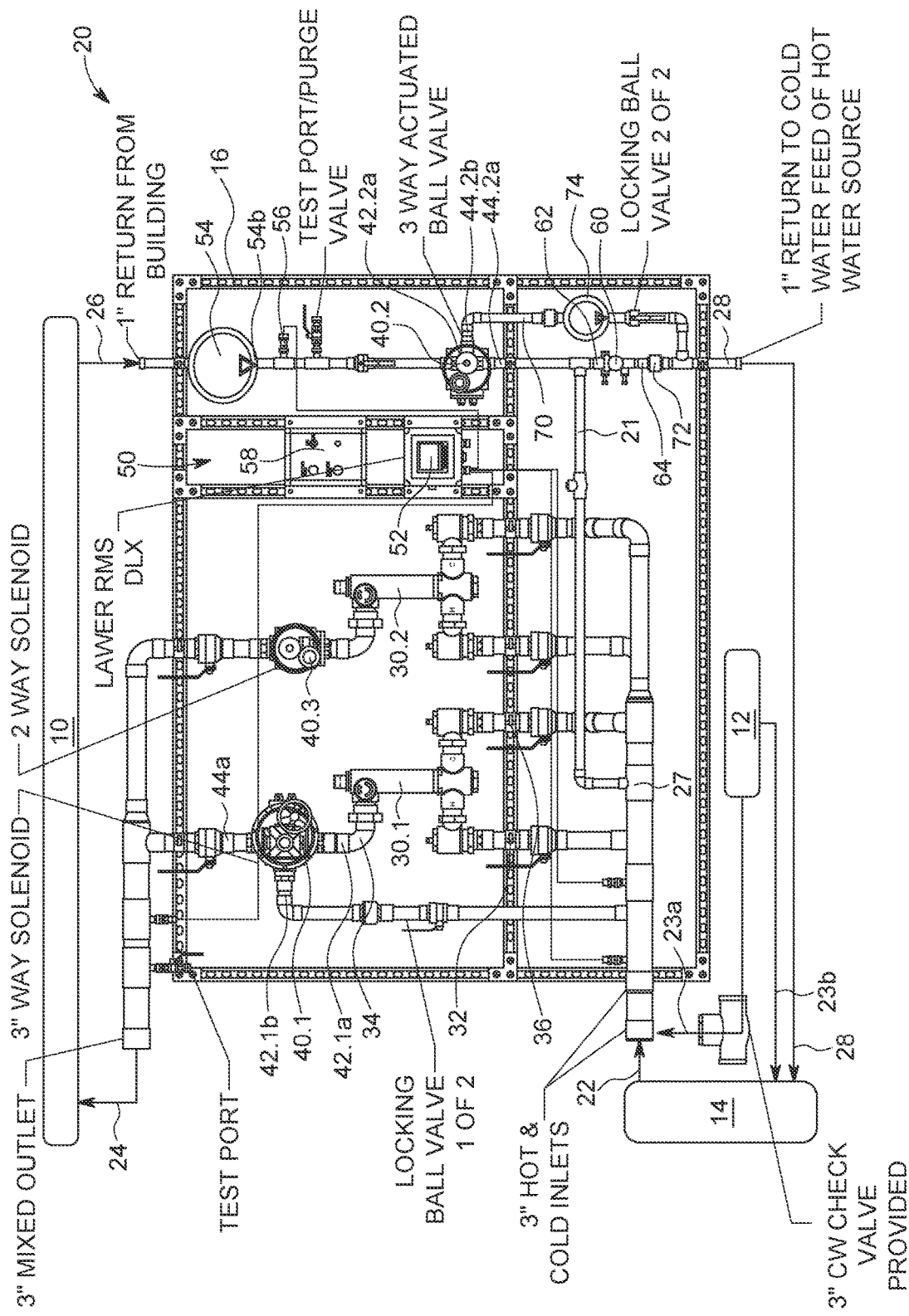
FIG. 1A is a schematic representation of a water supply system and of a water tempering system according to one embodiment of the present invention, shown configured for normal operation.

The following is a list of element numbers used with all of the embodiments, and at least one noun used to describe that element. The "X" for all of these numbers is replaced with a number (0 or greater) in the text and drawings of this application.

Consistent with statements made elsewhere in this specification, these various element numbers are used among multiple embodiments, and aspects of a particular element stated for one embodiment can be applied to the same element number in a different embodiment, except as shown and described differently, and as would be understood by a person of ordinary skill in the art. It is understood that none of the embodiments disclosed herein are limited to these nouns, and these element numbers can further include other words that would be understood by a person of ordinary skill reading and reviewing this disclosure in its entirety.

| X10 | water supply system |
|---|---|
| X12 | first source of water (e.g. city water) |
| X13 | on/off valve |
| X14 | water heater |
| X16 | frame |
| X20 | water tempering system |
| X21 | recirculation return |
| X22 | inlet for water from water heater hot outlet |
| X23a | inlet of cold water to feed manifold |
| b | inlet of cold water to hot water heater |
| X24 | return to water supply system |
| X25a | flushing and non-flushing flowpath |
| b | flushing |
| X26 | return from water supply system; main return from building system |
| X27 | second source (preferably a mix of cold water & return water) |
| X28 | outlet to water heater inlet |
| X29a | check valve |
| b | hand operated valve |
| X30 | Mixing valve |
| X32 | hot inlet |
| X34 | tempered water outlet |
| X36 | second source inlet |
| X40 | multi-flowpath actuatable valve |
| X42a | first inlet |
| b | second inlet |
| X44a | first outlet |
| b | second outlet |
| X46 | means for actuation |
| X50 | electronic flow control system |
| X52 | controller |
| X54 | pump |
| a | inlet |
| b | outlet |
| X56 | temperature sensor |
| X58 | input output panel |
| X60 | variable restriction valve |
| X62 | inlet |
| X64 | outlet |
| X70 | bypass flowpath |
| X72 | check valve |
| X74 | pump |

DETAILED DESCRIPTION OF ONE OR MORE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the word "preferably" implies the term "optional."

The use of an N-series prefix for an element number (NYY.YY) refers to an element that is the same as the non-prefixed element (YY.YY), except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that some features 1020.1 and 20.1 may be backward compatible, such that a feature of a later discussed embodiment (NYY.YY) may include features compatible with other various embodiments that were discussed earlier (MYY.YY), as would be understood by those of ordinary skill in the art. This description convention also applies to the use of prime ('), double prime ("), triple prime ("') and star or asterisk (*) suffixed element numbers. Therefore, it is not necessary to describe the features of 20.1, 20.1', 20.1", 20.1"' and 20* that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What follows are paragraphs that express particular embodiments of the present invention. In those paragraphs that follow, some element numbers are prefixed with an "X" indicating that the words pertain to any of the similar features shown in the drawings or described in the text. However, those of ordinary skill in the art will recognize various other non-X prefixed element numbers that discuss features applicable to other embodiments. If any of the discussion that follows makes reference to X-prefixed element numbers, the corresponding figures may use those same element numbers without the X-prefix, or with the N-series prefix described above.

This document may use different words to describe the same element number, or to refer to an element number in a specific family of features (NYY.YY). It is understood that such multiple, different words are not intended to provide a redefinition of any language herein. It is understood that such words demonstrate that the particular feature can be considered in various linguistical ways, such ways not necessarily being additive or exclusive.

The various figures herein show two different flow configurations of a water tempering system X20 according to one embodiment of the present invention. A first of a pair of figures shows system X20 in a first, typical configuration for the flow of tempered water to a water supply system X10. A second of that same pair of figures shows that same water supply system X20, except with various valves, switches, and software configured to flush water supply system X10 with water that provides a cleaning of both systems X10 and X20 so as to reduce the spread of biological toxins, especially those pertaining to legionnaire's disease. As will be shown and described herein, one way to achieve this cleansing of systems X10 and X20 is by use of hot water. However, in yet other embodiments this cleansing of these two systems is by way of a chemical agent (such as water containing bleach) that is provided to the water tempering system X20 when it is in a flushing configuration.

Referring to FIG. 1A, there is shown at the bottom of tempering system X20 an arrangement of different provisions of water at different temperatures that are provided as input to water system X20. One provision of water is a source X12 of water from a main supply, such as a city or county water system. Water from source X12 is typically the coldest water used in system X20. Source X12 provides cold water X23a to the inlet of a hot water heater X14, as well as separately by conduit X23a to an inlet to system X20. Water heated within water heater X14 is provided to an inlet X22 to the water system X20. In some but not all embodiments, water heater X14 is further provided with tempered water X28b that has returned from the water supply system X10.

Water supply system X10 typically includes a plurality of devices that utilize tempered water provided from outlet X24 of system X20. A portion of the water provided by X24 to X10 is returned to a return inlet X26 of tempered system X20. Water supply system X10 can include any device for which it is desirable to provide tempered water, such as faucets, showers, eyewashes, and the like.

Water tempering system X20 typically, but not always, includes one or more automatically controlled mixing valves X30, a plurality of hand-operated valves (these valve exteriors and handles being shown, sometimes with text), one or more multi-flowpath actuatable valves X40, and an electronic flow control system X50. It is understood that various embodiments of the present invention include various combinations of the aforementioned devices, but not necessarily each of the aforementioned devices. Typically, the water tempering system X20 is mounted to a frame X16 for ease of handling. In some embodiments, the various components are mounted to frame X16, and then shipped as a unit to an installation site, such as a hospital, residential building, commercial building, or the like.

Referring to FIG. 1A, it can be seen that system X20 includes a pair of mixing valves X30 operating in parallel and using sources of hot water, cold water, and water returned from the water supply system X10. It can be seen that each mixing valve X30 includes a hot inlet X32 receiving hot water from the hot water supply X22. Each mixing valve X30 further includes a second inlet that preferably receives water from a second source X27 that is a mixture of both cold water from inlet X23b and system X10 return water from a recirculation return line X21. It can be seen that in some systems, the water from return line X21 and from the cold inlet X23b are merged at a junction that combine to create the second source at the union X27 of the valves X30. However, the present invention also contemplates embodiments in which the return water X21 is not mixed with cold water and provided to a mixing valve. In yet other embodiments, the return water X21 is provided to the inlet of the hot water heater, and in yet other systems can be provided to yet other components for which it is desired to provide tempered water, or in yet other embodiments provided to a drain (not shown). Under normal operation, about ninety percent (or the majority) of returned water goes to conduit X21 and about ten percent (or the minority) flows to outlet X28. In contrast, in the flush mode, all of the return water flows through conduit X28.

Each mixing valve X30 preferably includes means for automatically controlling the mixing of water from the inlets X32 and X36, and providing tempered water at an automatically controlled temperature to a valve outlet X34. The means for automatically controlling the temperature of the tempered water can be of any type. Examples of such controlling means include liquid-filled thermostats, wax-filled thermostats, or any other device in which a flexible body (such as a tube in a coiled shape) is provided with a substance that changes volume or phase in response to temperature.

Still further examples of means for automatically controlling the temperature of the mixed water includes electronically actuated devices. Examples include mixing valves in which there is an orifice the shape and/or flow area of which is a function of an electronic signal from an electronic controller. In one example, the shape of the orifice can be controlled directly by an electronic actuator, the actuator being constructed such that it provides a force and/or shape that is electromagnetically controlled by an electronic controller. In yet other embodiments, there is an electronic actuator that operates on a thermostat, such as by changing the force on the thermostat and/or changing the position of the thermostat. In some electronically controlled mixing valves X30, there is an optional temperature sensor that is exposed to the mixed water (not shown), and providing an electronic signal corresponding to the water temperature to an electronic controller X52.

Preferably, system X20 includes an electronic flow control system X50 that can perform various functions, including any or all of the following: monitoring various water temperatures and reporting those temperatures; operating one or more electronically actuated multi-flowpath actuatable valves, operating one or more pumps driven by electric motors; and recording the history of operation of system X20, as examples. In some embodiments, electronic flow control system X50 includes an input/output panel X58 located on frame X16. This panel X58 can include one or more switches for operating control system X50, and one or more readouts corresponding to the operation of tempering system X20. In still further embodiments, controller X52 can include a display for providing information to a system operator standing near frame X16. In still further embodiments, data from control system X50 is provided to a remote monitoring and control station (not shown).

Water tempering system X20 preferably includes one or more multi-flowpath actuatable valves X40. The various multi-flowpath actuatable valves X40 shown and described herein constitute various means X46 for actuation of the valve X40 from one flowpath to another flowpath. These valves X40 in some embodiments accept an electrical signal from controller X52 (or from another source), and in response to that signal can change the flowpath of the valve X40. In still other embodiments, a multi-flowpath actuatable valve can be operated by hand by a person located proximate to the frame X16.

The configuration of the actuatable flowpath of a valve X40 can be of several different types. In some embodiments, a valve X40 is either on (permitting flow through the valve) or off (not permitting any flow through the valve). In yet other embodiments, a valve X40 can be actuatable to two different flowpaths. In some embodiments, the valve X40 includes two separate flowpaths, and the valve can be actuated to permit either of the flowpaths to be open, or only one of the flowpaths to be open and the other flowpath not to be open.

In yet other embodiments, the actuatable valve X40 includes a single inlet, and flow received at that valve inlet can be provided to a first outlet (when the valve is in a first position), or to a second outlet (when the valve is in a second position). Still other embodiments include an actuatable valve X40 having multiple inlets, and a single outlet, such that a first inlet is in fluid communication with the outlet in the first position, the second inlet is in fluid communication with the outlet in a second position, and in some embodiments further including a position in which each inlet is in fluid communication with the outlet. System X20 further contemplates such three-way valves in which one flowpath is open and the other flowpath is closed, and also those embodiments in which both flowpaths are open. Still further configurations of a multi-flowpath actuatable valve X40 include those in which there is a single inlet and a single outlet, and further in which the valve can be modulated to provide a variable flow resistance between the inlet and the outlet.

In some embodiments, a valve X40 can be electrically actuated to any of several configurations. This electronic actuation may be by one or more two position solenoids. In yet other embodiments, an electronic signal is used to drive an electric motor that changes the position of a mechanical valve, such as a ball valve. In still further embodiments, electronic signal can be provided to a two-stage valve, in which electrical signal changes the state of a first electro-hydraulic stage, and the pressure from that first stage is used to drive a second hydromechanical valve stage.

In some embodiments, tempering system X20 includes an auto return valve X60 that receives at its inlet tempered water returning from system X10. The inlet to this valve X60 is also in fluid communication with the cold water provided to inlet X23 of the manifold that feeds the lower temperature inlets X36 of mixing valve X30. This valve X60 (which may also be referred to a circuit setter) is configured to provide a back pressure to the water returning from system X10, such that this pressure of the return flow is higher than the pressure of the cold water from inlet X23 provided to the second source manifold. In this manner, some of the returned, tempered water is provided through flowpath X21 and then mixed with the cold water at a junction X27 and provided to the low temperature inlet X36 of the mixing valve X30.

Since this mixing of cold and tempered water raises the temperature, this second source of water requires less mixing with hot water in the mixing valve X30, and thus makes less overall demand of hot water from the heater X14. In some embodiments, the variable restriction valve X60 can be of various types, including a hand-operated valve, the setting of which establishes a fluid resistance. In still other embodiments, valve X60 may be a thermostatic balancing valve that self-adjusts a variable orifice to achieve a particular inlet pressure, or a particular pressure drop across the valve based on a set temperature. In still further embodiments, the variable restriction valve X60 can be a thermostatically controlled valve, such that the temperature of the water provided to recirculation return flowpath X21 has a controlled range of temperatures.

In those tempering systems X20 including an electronic control system X50, it is possible that during normal tempered water operation that the temperature of water exiting pump X54 is monitored by a temperature sensor X56, with this temperature provided to controller X52. Some controllers X52 are adapted and configured for normal operation that turns off pump X54 when the sensed temperature at the pump X54 exceeds a predetermined value. However, in some embodiments of the present invention during high temperature flushing operation, system X52 is adapted and configured to maintain operation of pump X54 regardless of the temperature sensed at pump output X54b. By maintaining operation of pump X54 during flushing operation, the pumping operation increases the speed with which the higher, anti-microbial temperatures are reached is significantly shortened. This override of the turnoff of pump X54 can be accomplished by controller X52 in some embodiments, and in other embodiments can be provided by a switch that overrides the control signal, and directly powers pump X54.

Figure 1B:
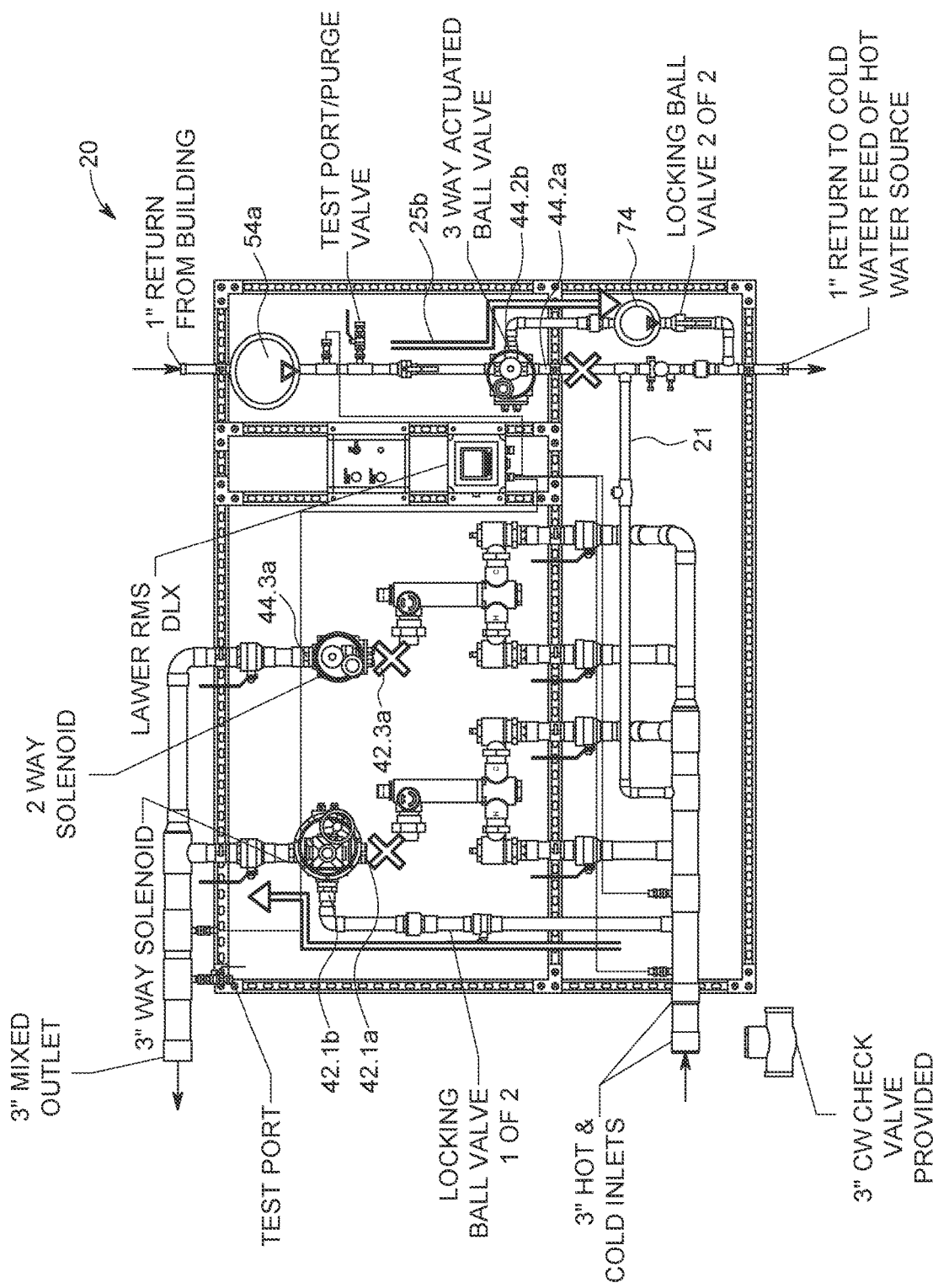
FIG. 1B is a schematic representation of the apparatus of FIG. 1A, except configured for hot flushing of the water supply system.

In some embodiments, system X20 further includes a flushing flowpath X70, although still other embodiments of the current inventions contemplate a return flowpath that is the same as the typical, tempered water flowpath. In the embodiments shown herein, there is a flushing flowpath X70 that is adapted and configured to provide a higher flowrate of hot water through the systems X20 and X10 during hot water sanitizing operation. In those embodiments having this optional flushing flowpath X70, there is preferably a multi-flowpath actuatable valve X40 that establishes whether or not the flushing flowpath X70 is in use. Some embodiments shown herein further include a pump 74 located in this flushing flowpath 70. Pump 74 is shown in FIGS. 1A and 1B, but it is understood that such a pump to boost the flushing flowpath is an option for any of the embodiments shown herein.

In a first position, the actuatable valve X40 preferably provides return water to a circuit setting valve X60, and also through a flowpath X21 to a union X27 where this return water is combined with cold water to provide a second source of water to the lower temperature inlet X36. This second source of water is therefore warmer than the cold water, but yet not as hot as the tempered water. In those systems X20 that include a return flowpath X70, the inlet to flowpath X70 (or the outlet of the flowpath X70) passes through a multi-flowpath actuatable valve X40. When this actuatable valve X40 is actuated to the second position, water returned from system X10 is provided to bypass flowpath X70. Water exiting flowpath X70 is preferably provided downstream of the outlet of restriction valve X60. Further, in some embodiments the first position outlet X44.2a is closed, thus stopping the flow of return water directly to flowpath X21.

However, the present invention also contemplates those embodiments in which in the second, flushing position the actuatable valve X40 not only opens a flowpath to bypass flowpath X70, but also maintains a supply to the inlet X62 of valve X60.

In the figures used herein depicting operation of the water tempering system X20 in the flushing mode, a symbolic X is used to show a flowpath that is preferably stopped during flushing operation, although it is understood that in some embodiments this flowpath may remain open. The use of a double arrow indicates a flushing flowpath provided preferably only during flushing operation, although in yet other embodiments this pathway may be open partially or fully during normal operation. The use of a single arrow indicates a flowpath that remains open during both normal operation and flushing operation.

Referring to FIG. 1A, in one embodiment system 20 includes three multi-flowpath actuatable valves 40.1, 40.2, and 40.3. Valve 40.1 in one embodiment is a motorized ball valve having two inlets and one outlet. One inlet 42.1a receives tempered water from the outlet 34 of valve 30.1. The other input 42.1b receives hot water preferably directly from a manifold provided with hot water 22 from the hot water heater. The single outlet 44.a provides flow from valve 40.1 to a manifold having an outlet 24 providing water to water supply system 10.

A second actuatable valve 40.2 includes a single inlet 42.2a receiving water at higher pressure from the outlet 54b of a pump 54. Valve 40.2 further includes a first outlet 44.2a that provides water to both a recirculation return flowpath 21 and further to the inlet 62 of a variable restriction valve 60. A second outlet 44.2b provides water to a bypassing flowpath 70 that is isolated from outlet 64 via the subsequent check valve 72.

System 20 further includes a third multi-flowpath actuatable valve 40.3. This valve includes a first inlet 42.3a receiving tempered water from the outlet of mixing valve 30.2. The single outlet 44.3a is in fluid communication with a manifold that provides water to an outlet 24 to system 10.

In normal operation, as shown in FIG. 1A, tempered water from mixing valve 30.1 is provided through a first flowpath in actuatable valve 40.1 to the manifold and to water supply system 10. Similarly, tempered water from valve 30.2 provides tempered water through valve 40.3 to the same manifold also to be delivered to water supply system 10. The tempered water not used by system 10 is preferably provided to the inlet 54a of a pump 54. The pump 54 is preferably an electrically motorized centrifugal pump, and provides a boost in pressure to the inlet of valve 40.2. In normal operation, this water flows in a first flowpath and is provided to outlet 44.2a, and subsequently to both restriction valve 60 and to recirculation return line 21. In some embodiments not all of this return flow from pump 54 is used by the mixing valves 30, and a supply of tempered water is provided by outlet 28, preferably to the inlet of a water heater 14.

FIG. 1B graphically illustrates the operation of system 20 during flushing operations. Valve 40.1 is actuated to a second position, in which the inlet 42.1a that would otherwise receive tempered water is blocked. In this second position the second inlet 42.1b is opened for fluid communication with outlet 44.1a. This inlet 42.1b receives hot water from inlet 22. This hot water is provided during flushing to the manifold that provides hot water through outlet 24 to system 10. Likewise, valve 40.3 is actuated to a second position, in which the inlet 42.3a is closed. Thus neither mixing valve 30.1 nor 30.2 is providing tempered water to system 10. Instead, hot water from the hot water heater bypasses the typical tempered water flowpath during the flushing operation.

In some embodiments, system 20 further includes the flushing flowpath shown in FIG. 1B, although still other embodiments of the current inventions contemplate a return flowpath that is the same as the typical, tempered water flowpath. As shown in FIG. 1B, the actuatable valve 40.2 is placed in the second position, such that the outlet 44.2a is closed, and water returned from system 10 is provided to a bypass flowpath 70.

Flowpath 70 preferably includes an outlet that is downstream of the outlet of restriction valve 60. Further, in some embodiments the first position outlet 44.2a is closed, thus stopping the flow of return water through flowpath 21, from which it is preferably mixed with cold water and provided to the second source (cold) inlet 36 of valves 30. However, the present invention also contemplates those embodiments in which in the second, flushing position the actuatable valve 40.2 not only opens a flowpath to bypass flowpath 70, but maintains a supply to the inlet 62 of valve 60.

In this second, flushing mode of operation water tempering system 20 preferably has a less restrictive flowpath for this return tempered water, as compared to the typical return flowpath during normal operation. Since this flushing flowpath for return water is less restrictive, it therefore takes less time to flush and sanitize water supply system 10.

Figure 2A:
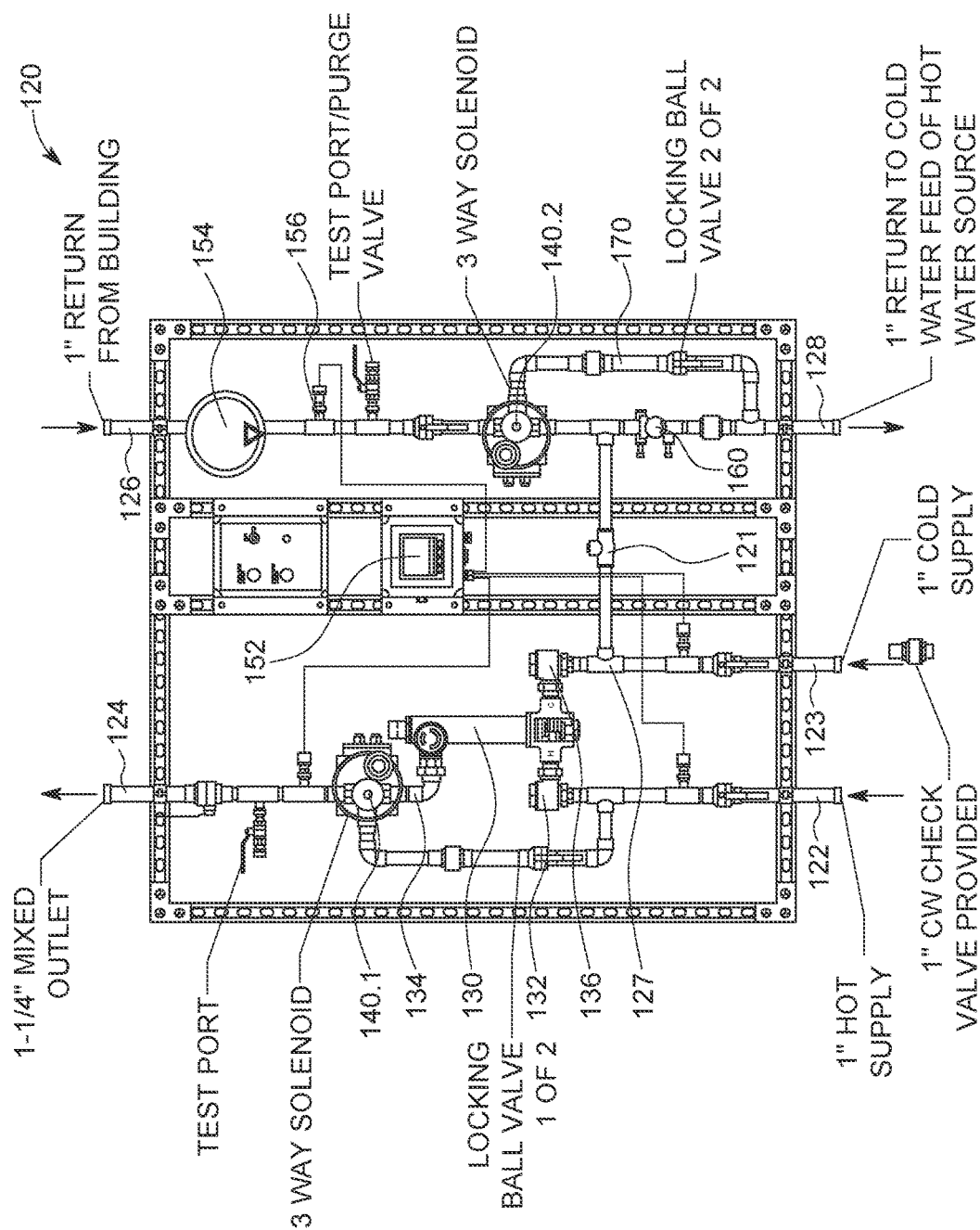
FIG. 2A is a schematic representation of a water supply system and of a water tempering system according to another embodiment of the present invention, shown configured for normal operation.
Figure 2B:
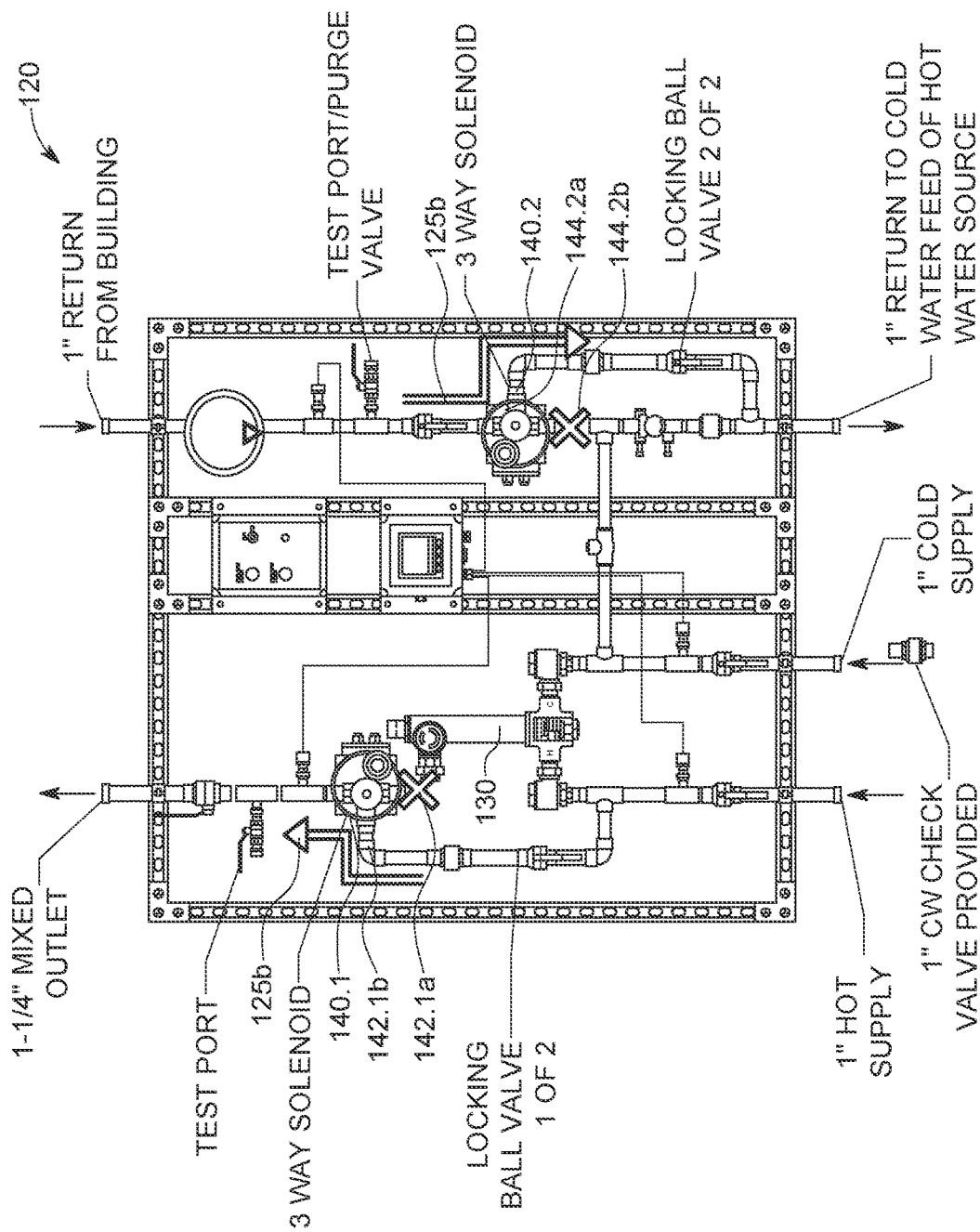
FIG. 2B is a schematic representation of the apparatus of FIG. 2A, except configured for hot flushing of the water supply system.

FIGS. 2A and 2B depict a system 120 similar to system 20, except utilizing a single mixing valve 130. It is understood that a still further variation of system 20 would replace 2-way valve 40.3 with a 3-way valve and plumbing similar to valve 40.1.

Figure 3A:
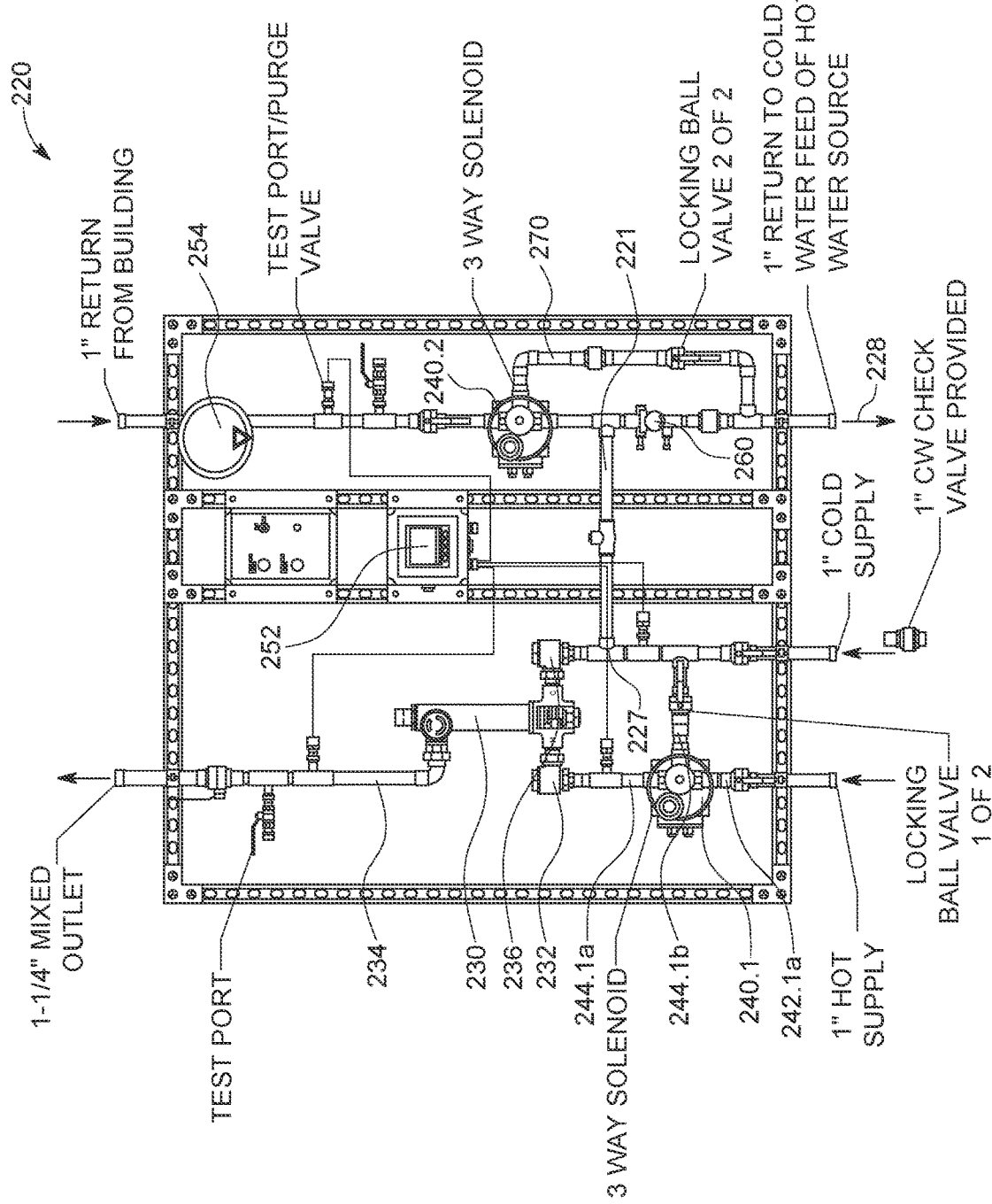
FIG. 3A is a schematic representation of a water supply system and of a water tempering system according to yet another embodiment of the present invention, shown configured for normal operation.
Figure 3B:
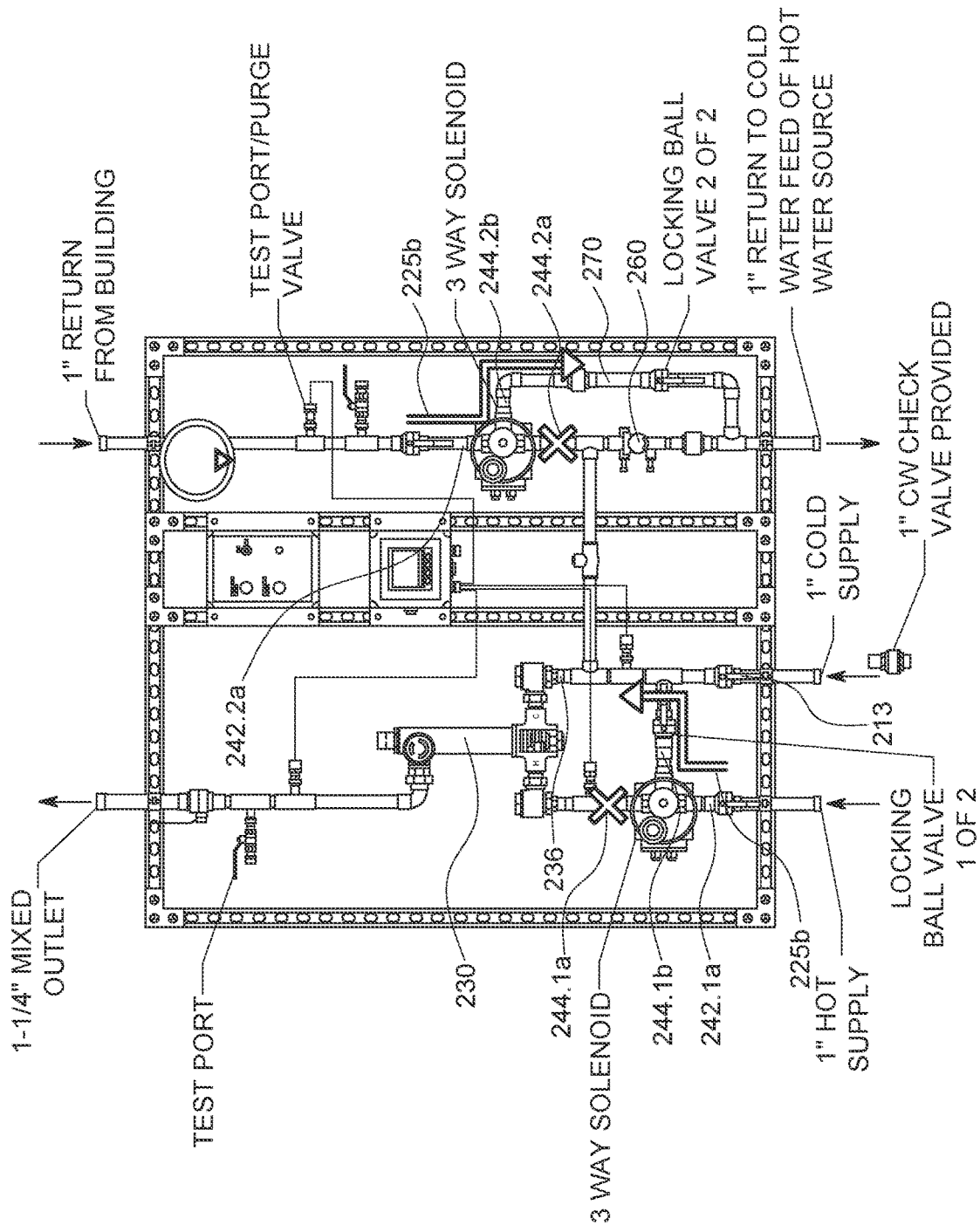
FIG. 3B is a schematic representation of the apparatus of FIG. 3A, except configured for hot flushing of the water supply system.

FIGS. 3A and 3B depict normal operation and flushing operation configurations, respectively, of a water tempering system 220 according to another embodiment of the present invention. It is understood for all of the embodiments shown herein that water is provided in a manner as discussed for sources X12 and X14, including the variations described, although these sources may not be shown on a particular figure. Further, all of the water tempering systems shown herein provide water to a water supply system X10 as previously discussed, along with the variations discussed, even if the water supply system is not shown.

FIG. 3A shows a system 220 having a 3-way, multi-flowpath actuatable valve 240.1 receiving hot water at an inlet 242.1a. During normal operation, hot water is provided to first outlet 244.1a in fluid communication with inlet 232 of mixing valve 230.

System 220 further includes a 3-way, multi-flowpath valve 240.2 receiving pressurized water from a pump 254. During normal operation, this return water passes through valve 240.2 to an outlet 244.2a, from where it is subsequently provided to preferably both a recirculation line 221 and also to the inlet of a restriction valve 260.

During normal operation, there can be times in which return water from system 110 (not shown) is pressurized by pump 254, and then provided through valve 240.2 to both a mixing union 227, and further to the inlet of valve 260. A portion of this return flow received by pump 254 may still remain after the branch off flowpath 221, and this remainder of return flow is provided by outlet 228 preferably to a hot water heater.

FIG. 3B depicts the configuration of tempering system 220 during flushing operation. Valve 240.1 is placed in a second position in which the outlet 244.1a is blocked, and the flowpath from inlet 242.1a to outlet 244.1b is open, as shown by double arrow 225b. Further, a valve 213 is closed, thus preventing flow of cold water to mixing valve 230. Further, persons of ordinary skill in the art will recognize that the graphic used to depict valve 213 is, along with other similar graphics, to represent similar valves in other parts of the flowpaths shown herein. It is understood that it is not necessary to identify each and every such manual valve or standard valve, when the graphic depictions are the same.

Therefore, in one version of this embodiment hot water is not provided to inlet 232, but instead is provided to colder temperature inlet 236 of valve 230. In this configuration, valve 230 is automatically controlled to open the cold inlet as much as possible, since mixing valve 230 is adapted and configured to open the cold inlet 236 when the temperature of the tempered water is too high. Therefore, portions of mixing valve 230 are flushed and sanitized with hot water. Still further embodiments of the present invention contemplate a second position flowpath through valve 240.1 in which inlet 242.1a remains open to inlet 232 during flushing operation.

This hot water continues to flow to system 210, and is then returned to the inlet of pump 254, in those embodiments that include such a return pump. Pressurized hot return water from pump 254 is received at the inlet 242.2a, which has been actuated to a second position in which the normal outlet 244.2a is closed, and instead flushing outlet 244.2b is open. As indicated by the double arrows 225b, water is now able to flow through a bypassing flowpath 270, which is preferably significantly less restrictive than the typical operation flowpath through pathways 221 and valve 260.

Figure 4A:
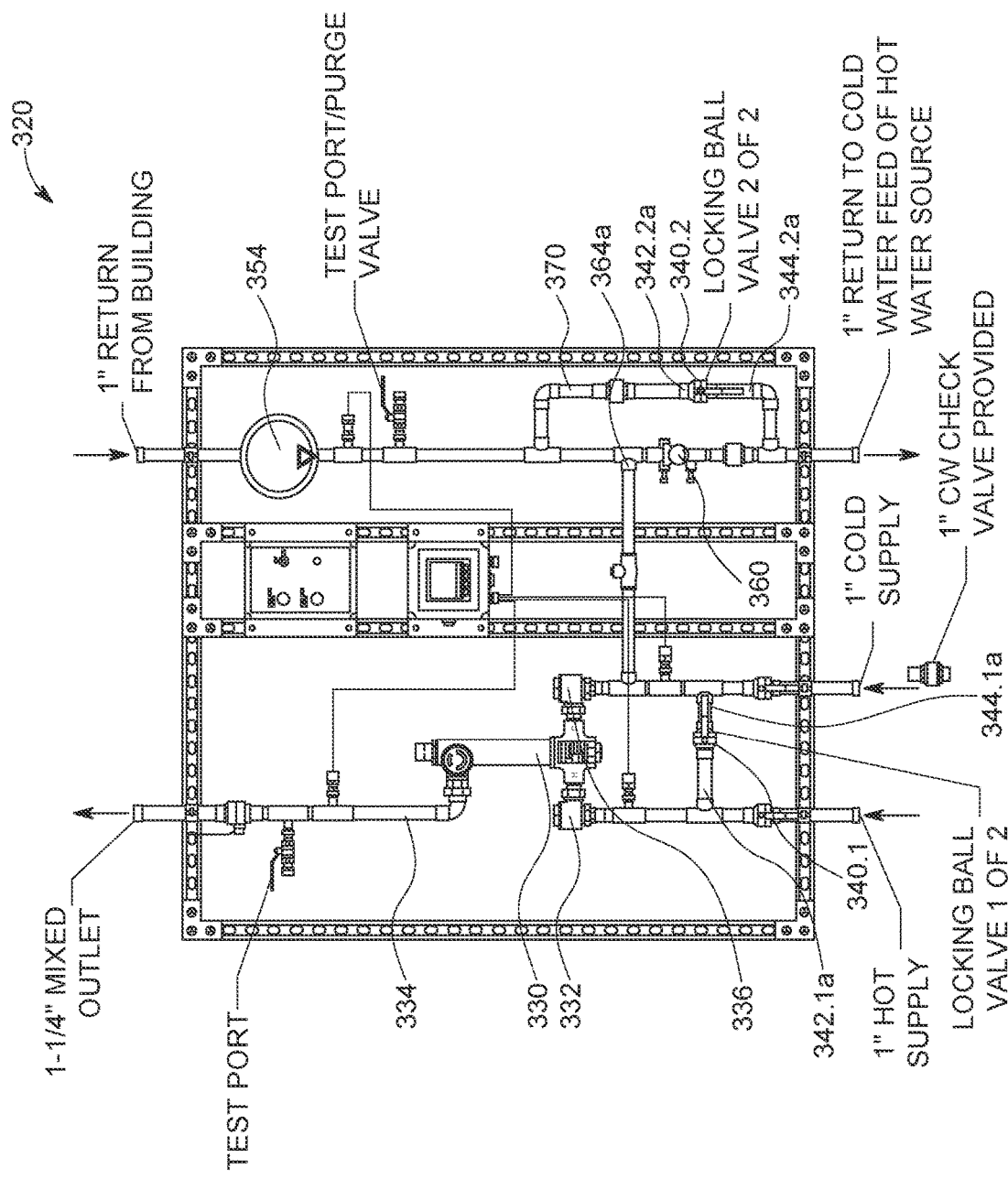
FIG. 4A is a schematic representation of a water supply system and of a water tempering system according to yet another embodiment of the present invention, shown configured for normal operation.
Figure 4B:
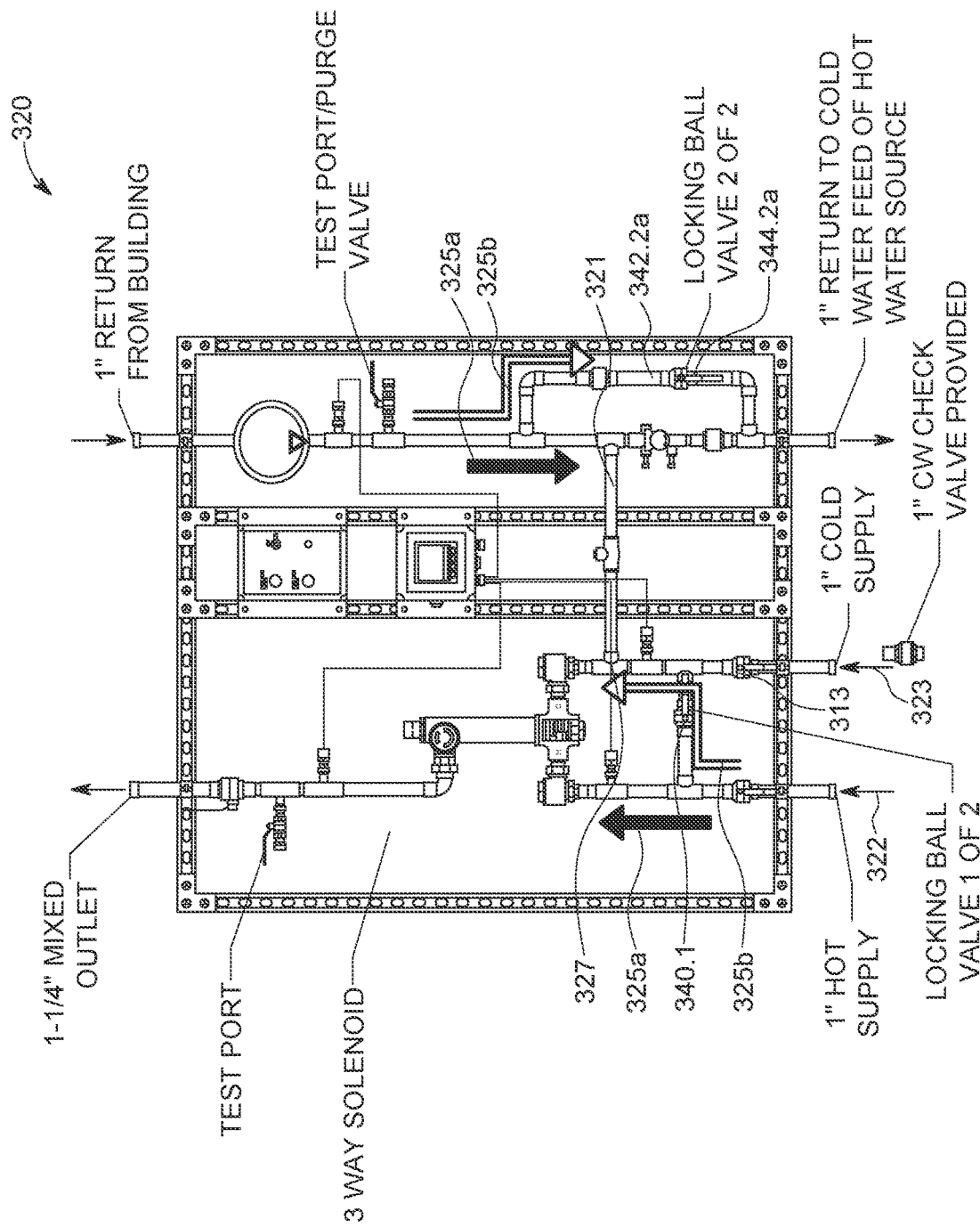
FIG. 4B is a schematic representation of the apparatus of FIG. 4A, except configured for hot flushing of the water supply system.

FIGS. 4A and 4B depict a system 320 similar to that of system 220, except including 2-way multi-flowpath valves 340.1 and 340.2, and still further in which these multi-flowpath valves are hand actuated. It is understood by persons of ordinary skill in the art that still further alternatives to systems 220 and 320 are contemplated, in which electrically operated 2-way valves can be used, or in which hand operated 3-way valves can be used. Still further, yet other embodiments are contemplated in which a 3-way valve is located at one or the other of the hot water inlet to the mixing valve, and either a 2-way or a 3-way valve is contemplated at the inlet to the bypass loop.

FIG. 4A shows a water tempering system 320 configured for normal operation in which it provides tempered water to a water supply system 310. A multi-flowpath actuatable valve 340.1 has an inlet 342.1a that is in fluid communication with hot water being provided to inlet 332 of mixing valve 330. An outlet 344.1a is in fluid communication with water provided to lower temperature inlet 336 of valve 331. During normal operation, valve 340.1 is closed, denying fluid communication between inlet and outlet.

System 320 further includes a second multi-flowpath actuatable valve 340.2 located preferably in a bypass line 370. The inlet 342.2a is in fluid communication with pressurized return water from pump 354, in some embodiments this inlet is further in fluid communication with the inlet to a restrictive valve 360, and further with a flowpath 321. The outlet 344.2a is in fluid communication with the outlet of valve 360 (for those embodiments having such a valve), and tempered return water from the outlet of valve 340.2 is preferably returned to the inlet of a water heater 314 (not shown). In the normal mode of operation, valve 340.2 is preferably adjusted to prevent fluid communication between inlet 342.2a and outlet 344.2a.

FIG. 4B graphically depicts the operation of system 320 during high temperature flushing. Further, a valve 313 is closed, thus preventing flow of cold water to mixing valve 330. Valve 340.1 has been actuated to a second position, in which hot water is provided to outlet 344.1, and at this outlet the hot water mixes with cold water provided by cold water inlet 323. This mixture of hot and cold water further mixes with return tempered water at junction 327 to provide water to inlet 336 of valve 330. One difference between systems 220 and 320 is that during flushing operation system 320 maintains hot water flow to inlet 332, as indicated by solid arrow 325a. Therefore, during flushing operation valve 330 is provided with hot water at each inlet, along with cold water and return tempered water at the inlet 336.

System 320 in the flushing mode further includes the placement of valve 340.2 in a second position, such that pressurized return tempered water from pump 354 is able to flow through pathway 370, bypassing flowpath 321 (for embodiments having such a flowpath) and further bypassing circuit setting valve 360 (for those embodiments having such a circuit setting valve). In one difference between systems 220 and 320, it can be seen as indicated by the solid arrow 325a that pressurized tempered return water is still provided to recirculation return flowpath 321, and still further to the inlet of valve 360.

System 320 in the flushing position therefore provides more flowpaths into water supply system 310 (i.e., through both inlets of mixing valve 330), and further provides more outlets for the return, high temperature flushing water (through all of flowpath 31, though valve 360, and also through return flowpath 370).

Figure 5A:
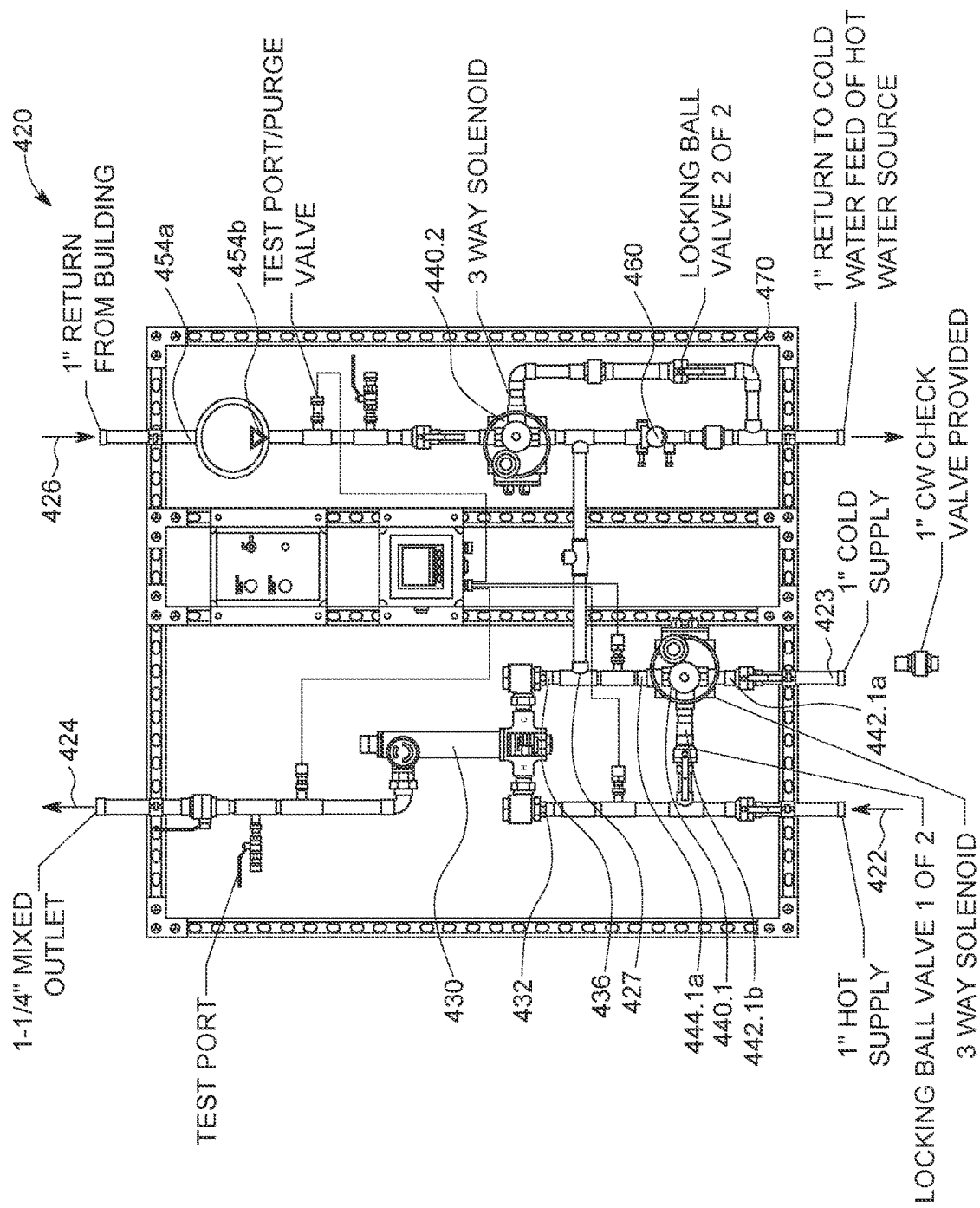
FIG. 5A is a schematic representation of a water supply system and of a water tempering system according to yet another embodiment of the present invention, shown configured for normal operation.
Figure 5B:
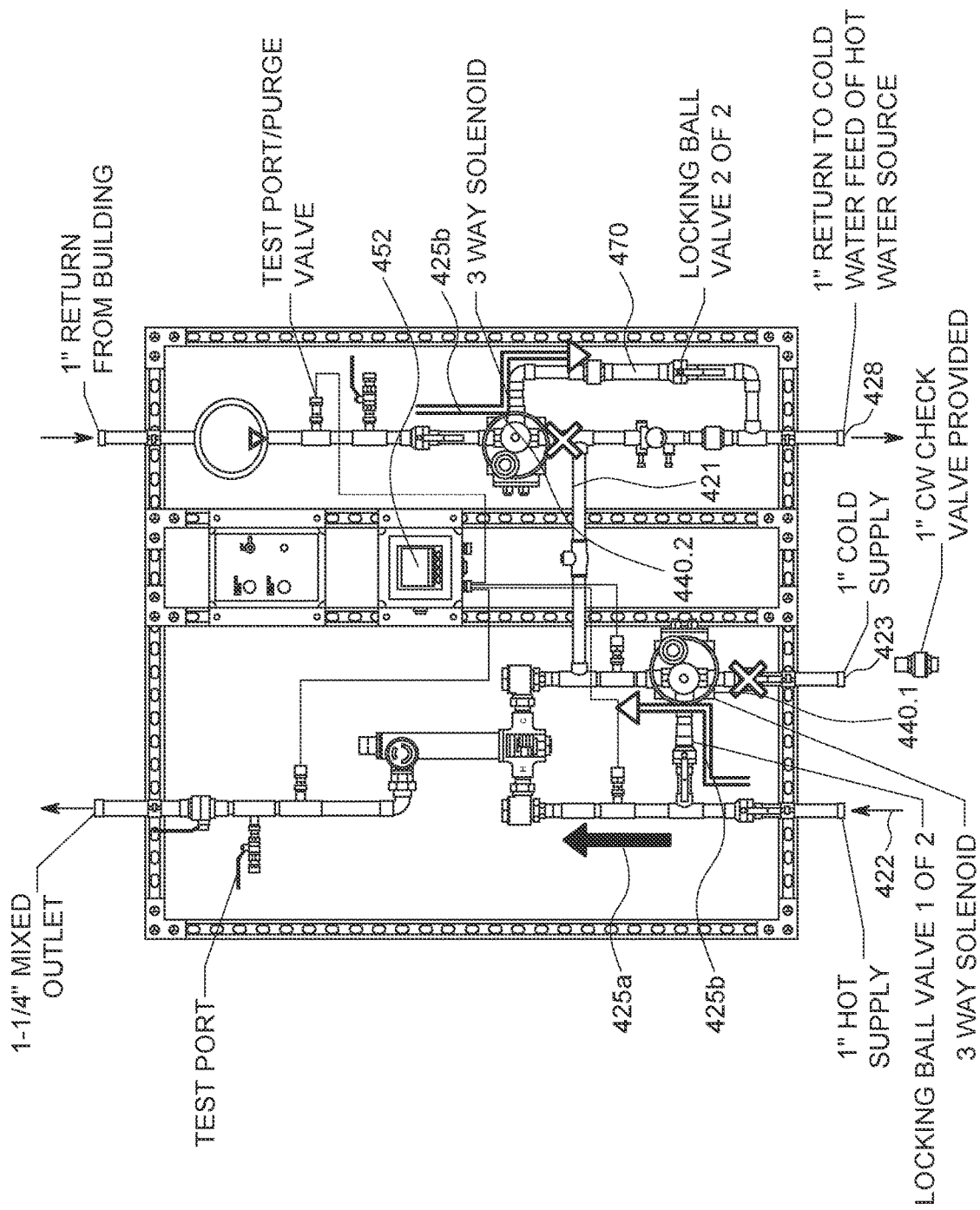
FIG. 5B is a schematic representation of the apparatus of FIG. 5A, except configured for hot flushing of the water supply system.

FIGS. 5A and 5B depict a water tempering system 420 according to another embodiment of the present invention. Generally, it can be seen that system 420 has a water return system similar to that discussed for system 20, but a different manner of providing water to valve 430, as will be shown and described.

Referring to FIG. 5A, it can be seen that system 420 includes a multi-pathway actuatable valve 440.1 preferably having two inlets and one outlet. A first inlet 442.1a receives water from cold water inlet 423. A second inlet 442.1b is in fluid communication with water received from hot water inlet 422. The outlet 444.1a is in fluid communication with lower temperature water inlet 436 of valve 430, and further with return water from flowpath 421 through a union 427, for those embodiments having such a return flowpath. During normal operation, water from cold supply 423 is provided to valve 440.1 in the first position, in which this cold water is in fluid communication with inlet 436. Inlet 442.1b is closed in the first position.

FIG. 5B graphically depicts the operation of system 420 during flushing operation. It can be seen that valve 440.2 is configured to deny the flow of return water to flowpath 421 and to valve X60. Instead, as indicated by arrow 425b, return water flows through bypass flowpath 470. As discussed previously, and for the embodiments shown herein, bypass flowpath X70 has fewer restrictions to flow than flowpath X21 or the flowpath through valve X60.

FIG. 5B shows that valve 440.1 has been placed in the second position, in which the flow of cold water is blocked.

The flow of hot water (as indicated by dual arrow 425b) is provided by the second position to the outlet 444.1a, and is subsequently provided to inlet 436, and further to junction 427. This hot water flows through valve X30 from inlet 436. FIG. 5B also shows that the flow of hot water is maintained to inlet 432 of valve 430. It is also to be noted that the flow of hot water from outlet 444.1a is also in fluid communication with flowpath 421, and further to the inlet of valve 460.

Figure 6A:
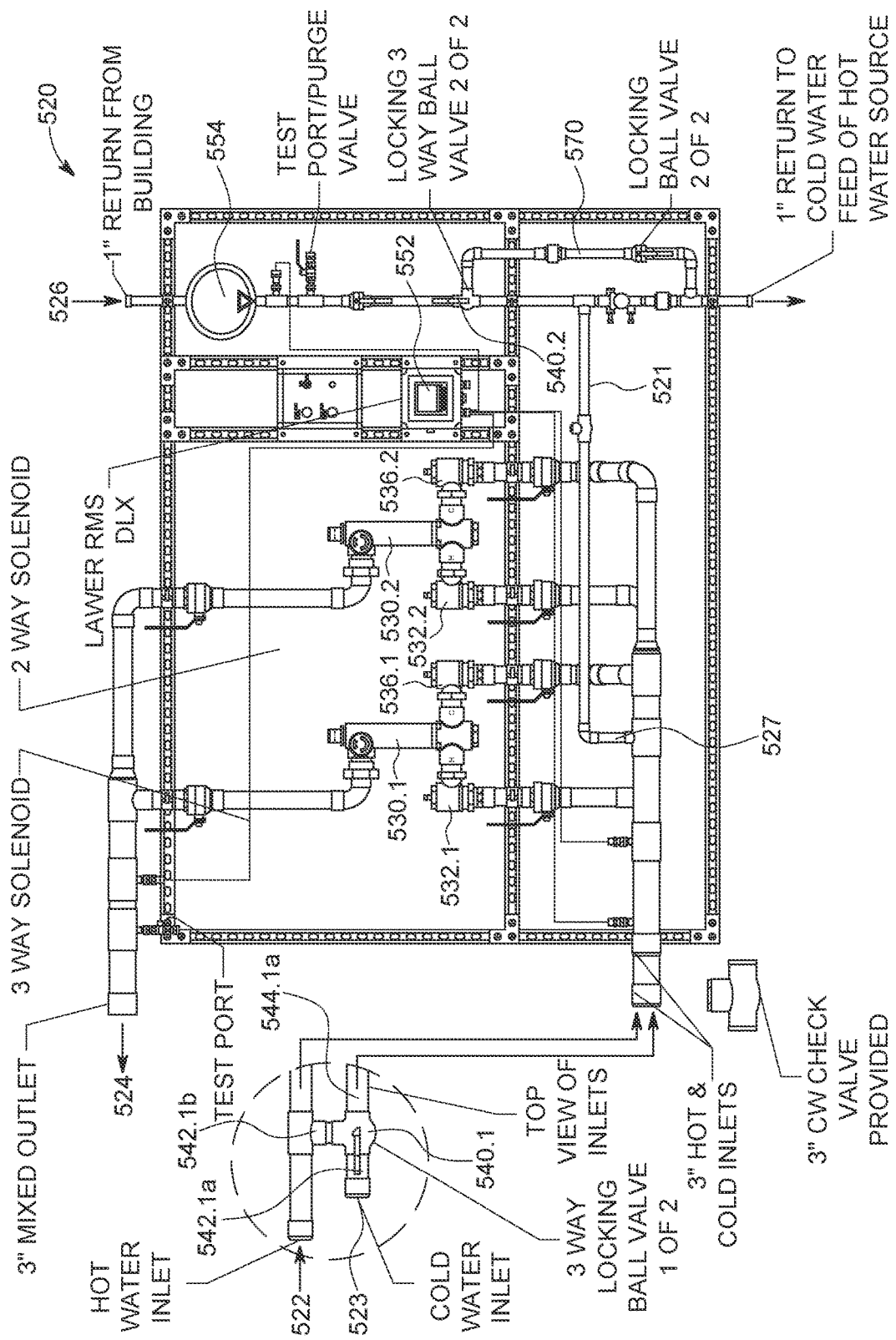
FIG. 6A is a schematic representation of a water supply system and of a water tempering system according to yet another embodiment of the present invention, shown configured for normal operation.
Figure 6B:
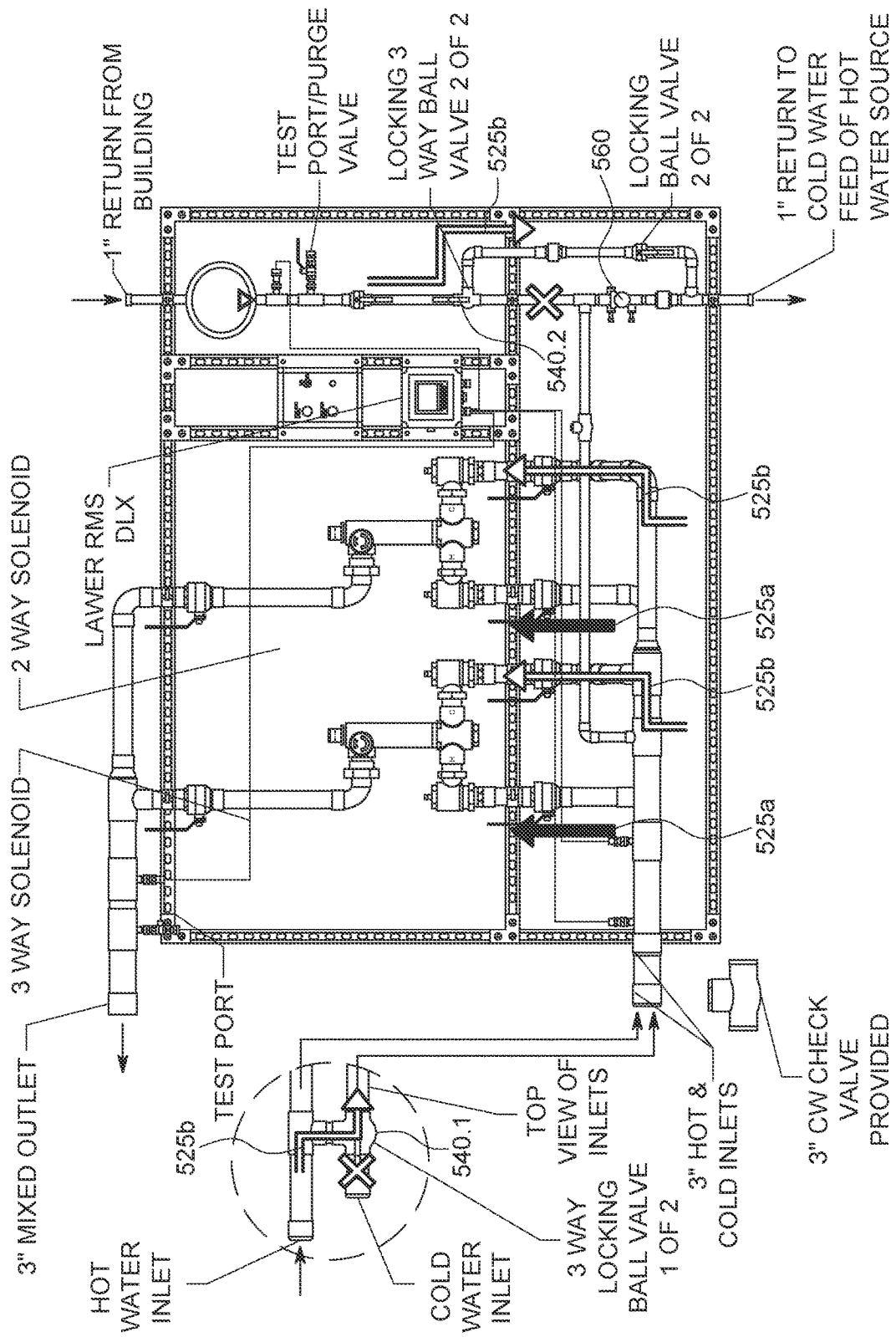
FIG. 6B is a schematic representation of the apparatus of FIG. 6A, except configured for hot flushing of the water supply system.

FIGS. 6A and 6B depict the normal and hot flushing configurations, respectively, of a water tempering system 520 according to another embodiment of the present invention. As shown, system 520 includes a plurality of mixing valves 530.1 and 530.2, and further contemplates those embodiments in which still further mixing valves are provided, and also contemplates an embodiment in which only a single mixing valve is provided.

An inset figure on the left side of FIG. 6A shows a top view, looking down, of the water supply manifolds for system 520. A hot inlet 522 provides hot water to a hot manifold that is in fluid communication with hot inlets 532.1 and 532.2. A cold water inlet 523 provides water to a manifold that is in fluid communication with lower temperature inlets 536.1 and 536.2. It is to be noted that the union 527 providing return water through flowpath 521 is located in the cold water manifold upstream of the first cold water inlet 536.1, thereby providing second source water (i.e., a mixture of return water and cold water) to the cold water inlets.

The inset figure shows a multi-flowpath actuatable valve 540.1 having two inlets and a single outlet. A first inlet 542.1a is in fluid communication with cold water inlet 523. In the first position, this valve provides water from inlet 523 to outlet 544.1a. Valve 540.1 further includes an inlet 542.1b that is in fluid communication with hot water from inlet 522.

System 520 further includes a 3-way multi-flowpath actuatable valve 540.2 similar to that of valve 40.2 of system 20, except that valve 540.2 is indicated to be manually actuatable. It is understood that either embodiment 520, 20, or any of the other return flowpath shown herein can be manually actuatable or electrically actuatable.

FIG. 6B shows operation of water tempering system 520 during flushing operation. Valve 540.1 has been placed in the second position, such that hot water is provided to outlet 544.1a and thereby to the cold water supply manifold. It can be seen that this hot water flushing flowpath 525b is provided to the cold manifold, and subsequently to inlets 536.1 and 536.2. Further, hot water from the tank remains in fluid communication with the hot manifold, such that the hot water flowpath 525a to the hot inlets 532 is maintained. FIG. 6B further shows that valve 540.2 has been placed in the second position, such that preferably no return water is provided to flowpath 521, nor to valve 560.

Figure 7A:
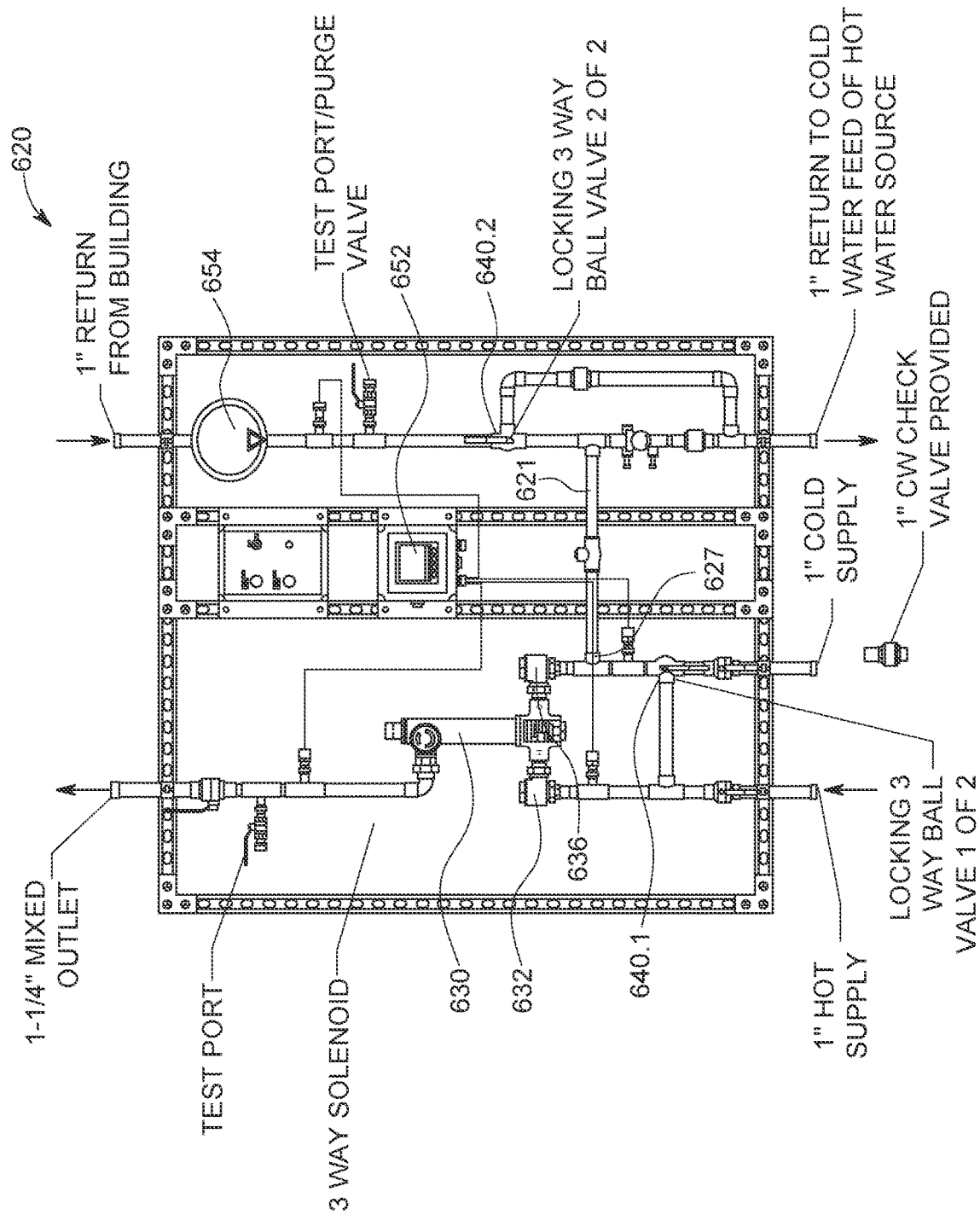
FIG. 7A is a schematic representation of a water supply system and of a water tempering system according to yet another embodiment of the present invention, shown configured for normal operation.
Figure 7B:
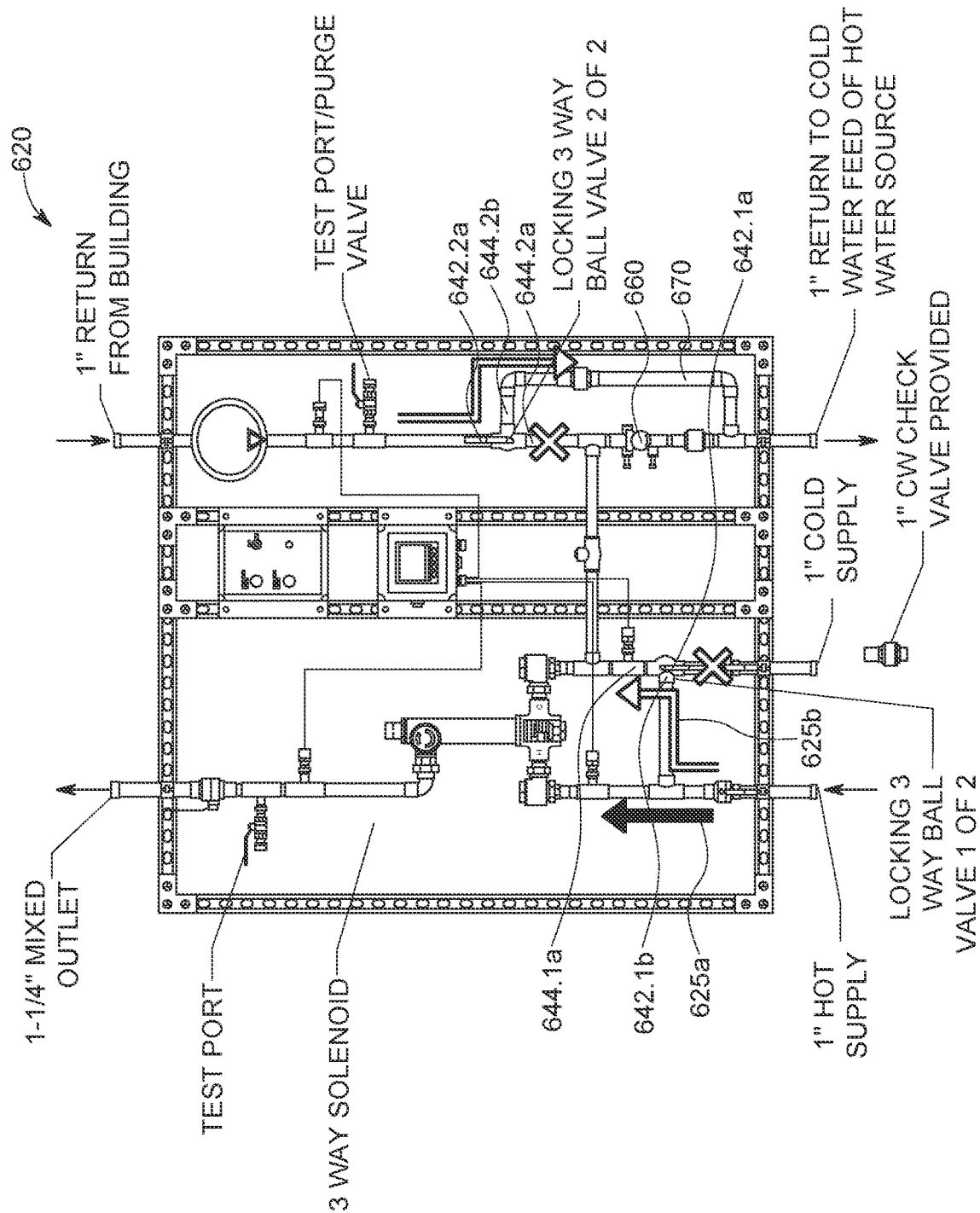
FIG. 7B is a schematic representation of the apparatus of FIG. 7A, except configured for hot flushing of the water supply system.

FIGS. 7A and 7B show normal operation and flushing configurations, respectively, of a system 620 according to another embodiment of the present invention. System 620 includes a first multi-flowpath actuatable valve 640.1 of the 3-way type, having a first inlet 642.1a in fluid communication with the cold supply. A second inlet 642.1b is in fluid communication with hot water provided through the hot water manifold, and further with the water provided to hot inlet 632. The outlet 644.1a is in fluid communication with lower temperature inlet 636 of valve 630, and preferably further receiving tempered return water from return flowpath 621. Although a single mixing valve 630 is shown and described, it is understood that the present invention contemplates still further embodiments having multiple mixing valves.

Water tempering system 620 further includes a 3-way multi-flowpath actuatable valve 640.2 having a single inlet and preferably 2 outlets. A first inlet 642.2a receives return water from system 610 (not shown). A first outlet 644.2a, when the valve is in the first position, provides this tempered return water to flowpath 621 and to the inlet of valve 660. A second outlet 644.2a is in fluid communication with a flowpath 670.

FIG. 7B shows system 620 in a flushing configuration. Valve 640.1 has been actuated to a second position in which hot water is provided through outlet 644.1a to inlet 636 of valve 630. Simultaneously, hot water continues to flow from inlet 622 to inlet 632.

In one embodiment of flushing operation, the valve 640.2 is actuated to a second position in which tempered return water from pump 654 flows through bypass line 670. In some embodiments, the flow of return water to flowpath 621 and valve X60 is blocked.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A water tempering system for flushing a water supply system of a building with water, comprising:
   a water heater receiving water from a first source and providing hot water;
   a second source of water;
   a mixing valve (MV) having a first MV inlet configured to receive hot water from said water heater and a second MV inlet receiving water from the second source, said mixing valve being adapted and configured to mix hot water and water from said second source and provide tempered water at an automatically controlled temperature to a water supply system of a building;
   a pump receiving water from the water supply system of the building and providing the water at a higher pressure; and
   a first multi-flowpath (1MF) actuatable valve having a 1MF inlet receiving pressurized water from said pump, a first 1MF outlet in fluid communication with said second source, and a second 1MF outlet in fluid communication with said first source, said first actuatable valve being actuatable to a first position in which the 1MF inlet is in fluid communication with the first 1MF outlet, and actuatable to a second position in which the 1MF inlet is in fluid communication with the second 1MF outlet.

2. The system of claim 1 which comprises a second multi-flowpath (2MF) actuatable valve having a first 2MF inlet receiving hot water, a second 2MF inlet receiving water from said second source, and a 2MF outlet, said second actuatable valve being actuatable to a first position in which the first 2MF inlet is blocked, and actuatable to a second position in which the first 2MF inlet is in fluid communication with the second MV inlet.

3. The system of claim 1 wherein said first actuatable valve is manually actuatable between the first position and the second position.

4. The system of claim 1 wherein said first actuatable valve is electrically actuatable between the first position and the second position.

5. The system of claim 1 wherein said mixing valve automatically controls the temperature of the tempered water with an electronic actuator.

6. The system of claim 1 wherein said mixing valve automatically controls the temperature of the tempered water with a thermostat.

7. The system of claim 1 wherein said mixing valve automatically controls the temperature of the tempered water with an electronic actuator that is operable on a thermostat.

8. The system of claim 1 which further comprises an electronic flow control system including a controller operably connected to said pump to control electrical power to said pump, said controller receiving a temperature signal corresponding to the temperature of the water received by the pump.

9. The system of claim 8 wherein said controller is adapted and configured to reduce power to said pump if the temperature signal exceeds a predetermined threshold.

10. The system of claim 8 wherein said controller is adapted and configured to not reduce power to said pump if the temperature signal exceeds a predetermined threshold and said multi-flowpath actuatable valve is in the second position.

11. The system of claim 1 wherein said pump is a first pump and which further comprises a second pump having an inlet receiving water from the outlet of said first actuatable valve and providing the water at a higher pressure to said first source.

12. The system of claim 1 wherein said multi-flowpath actuatable valve is actuatable to a third position in which the 1MF inlet is in fluid communication with the first 1MF outlet and the second 1MF outlet.

13. The system of claim 1 which further comprises a variable restriction valve having an inlet, an outlet, and a variable fluid restriction therebetween, said VR inlet being in fluid communication with said second source, said VR inlet receiving water from said first outlet of said multi-flowpath valve, said VR outlet being in fluid communication with said first source.

14. The system of claim 13 wherein said variable restriction valve is manually actuatable within a range of fluid restrictions.

15. The system of claim 13 wherein said variable restriction valve is a thermostatic balancing valve.

* * * * *